Oct. 12, 1943.  E. L. LOREHN ET AL  2,331,557
COMPOSITE BODY VALVE RAM
Original Filed Dec. 27, 1937   2 Sheets-Sheet 1

ED. L. LOREHN.
HERBERT ALLEN
INVENTOR.

Jesse R. Stone
Lester B. Clark
BY
ATTORNEYS

Patented Oct. 12, 1943

2,331,557

UNITED STATES PATENT OFFICE 2,331,557

COMPOSITE BODY VALVE RAM

Edmond L. Lorehn and Herbert Allen, Houston, Tex., assignors to Cameron Iron Works, Houston, Tex.

Original application December 27, 1937, Serial No. 181,831, now Patent No. 2,293,153, dated August 18, 1942. Divided and this application November 4, 1941, Serial No. 417,860

10 Claims. (Cl. 251—159)

The invention relates to a valve or blowout preventer ram construction for the purpose of shutting off high pressures.

In the closing of valves and blowout preventers against enormous pressures, the pressure in the passage therethrough is available against the exposed face of the valve member or ram. Where large passages are to be closed and pressures approximating several thousand pounds per square inch are encountered an enormous force is required to close such a valve. Therefore the present invention directs itself to a manner of equalizing the pressure on the forward and rear sides of a valve member or ram and at the same time effecting sealing action about the passage through the valve.

It is one of the objects of the invention to provide a valve or ram member which will close off the passage of equalizing pressure to or from the rear face of the member at or about the time the closure of the member is completed.

Another object of the invention is to provide a valve member or ram wherein the pressure on its two faces is equalized by a passage through the ram member.

Another object of the invention is to provide a composite body valve ram wherein the applied pressure actuates the ram to closed position and maintains the seal.

Still another object of the invention is to provide a device wherein the equalized pressure on the rear face of a ram is cut off at the time the ram closes and the pressure behind the ram member trapped so as to tend to hold the ram closed.

Still another object of the invention is to admit equalizing pressure to the rear face of a ram member as soon as the ram member begins to open.

The present application is a division of our prior copending parent application, Serial No. 181,831, filed December 27, 1937, now Patent No. 2,293,153, granted August 18, 1942.

Other and further objects of the invention will be readily apparent when the following description is considered in connection with the accompanying drawings wherein.

Figure 1:
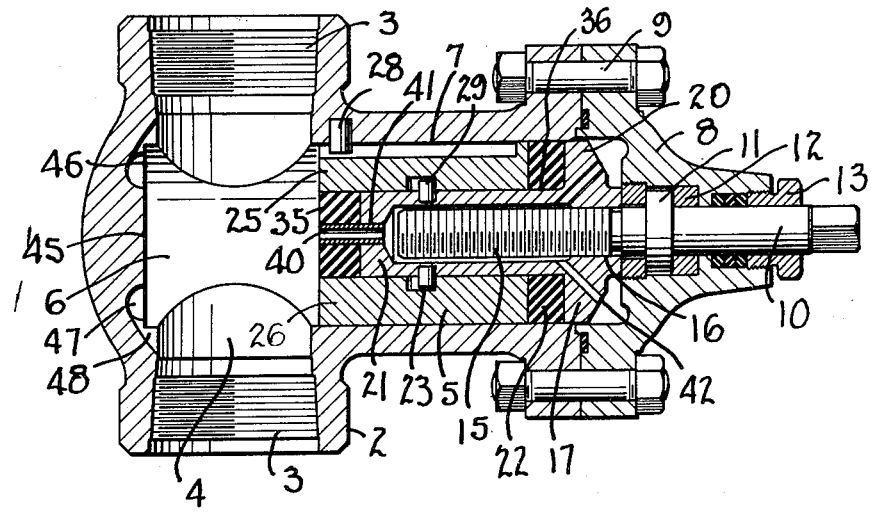
Fig. 1 is a vertical sectional view through a valve embodying the invention and illustrating the valve in open position.

In Fig. 1 a valve generally known as a drilling valve is illustrated at 2. This valve is provided with threaded areas 3 at the top and bottom thereof to receive the other portions of the well fittings, but in lieu of this threaded area it may be provided with a flange by which it is connected. A vertical passage through the valve is to be closed by the valve member 5 which is here illustrated as a cylindrical member and the passage 4 is curved at 6 to allow the transverse movement of this valve member 5. It is to be understood that the valve member may take some other configuration if desired.

The valve member in open position is retracted into a cylindrical chamber 7 which is closed by the bonnet 8 thereon. This bonnet is attached to the valve body by a series of bolts 9.

A spindle or stem 10 is rotatably mounted in the bonnet with the collar 11 thereon confined between the thrust rings 12. A stuffing box 13 closes the bonnet and this stem is of the non-rising type, being provided with threads 15 which engage with similar threads 16 in the cap member 17 which forms part of the valve member 5.

This cap 17 is of peculiar configuration in that it has an enlarged head 20 which receives the spindle and a reduced portion providing the sleeve 21. A suitable packing 22 is positioned about the sleeve 21 and against the head so as to form a seal with the cylinder 7.

On the top and bottom of the stem 21 retaining or reinforcing plates 25 and 26 are mounted. These plates are restrained against rotational movement in the chamber 7 by means of the dowel pins 28 and they in turn restrain the cap 20 from rotation by the dowel pins 29. Of course, if a non-circular ram were provided these dowel pins would be unnecessary.

Figure 4:
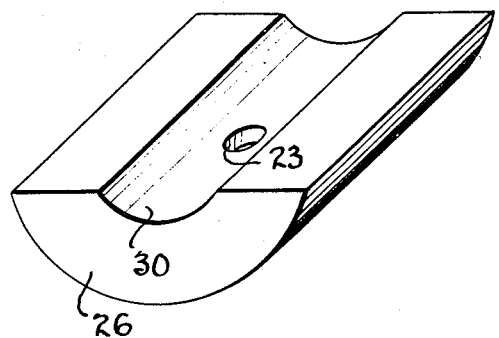
Fig. 4 is a perspective view showing one of the reinforcing plates for the packing member.

The plates 25 and 26 are best seen in Fig. 4, and are substantially less than semi-circular with a cut out portion 30 therein, which will fit about the periphery of the sleeve 21.

Figure 3:
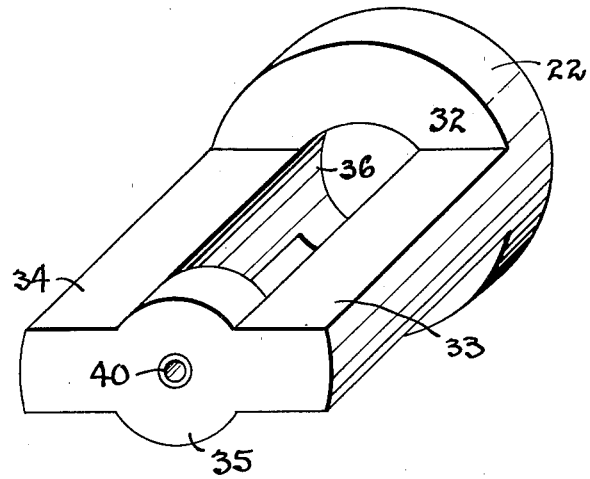
Fig. 3 is a perspective view of the packing member which is to be reinforced by the plate of Fig. 4.

It seems clear that if the cap 20 and the plates 25 and 26 were assembled there would be spaced areas between them to receive the packing member 22. This packing member is seen in perspective view in Fig. 3 and comprises a head 32 which has the integral leg portions 33 and 34 projecting laterally from the sides thereof. The extreme ends of these legs are joined to a hub 35 which is also of resilient material. The circular portion of the head is open at 36 so that the sleeve 21 may project into this recess. It seems clear that this packing head 32 may be passed over the stem 21 and then the top and bottom plates 25 and 26 deposited in position so that they will overlie the leg portions 33 and 34 as well as the hub 35. In this manner the resilient packing will be completely confined with the rear ends of each of the plates 25 and 26 abutting against the head 32 of the packing and pressing it against the head 20 of the cap 17.

Particular attention is directed to the provision of a bypass nipple 40 which is preferably of metal and extends through the hub 35. This nipple is of sufficient length to pass into the opening 41 in the end of the sleeve 21 so that the parts will be assembled as seen in Fig. 1. The head 20 of the cap 17 is provided with passages 42 so that any pressure entering the nipple 40 may discharge into the chamber 7 to the rear of the ram. In this manner any pressure occurring on the front face of the member will also be available in the chamber behind the member so as to equalize such pressure.

The valve 2 is provided with an outstanding seat 45 which extends transversely of the central passage 4 at one side thereof and the housing is formed with a depression 46 into which the ram member may move. The seat is outstanding because of the grooves 47 at the top and bottom thereof and these grooves merge with a choke portion 48 to restrict the flow past the valve member as it moves to closed position or as it begins its opening movement.

The particular construction of this outstanding seat and the choke portions is disclosed in the applications for patent of Herbert Allen and James S. Abercrombie, Serial No. 62,267, filed February 4, 1936, for Drilling valve, which has matured into Patent 2,162,990, dated June 20, 1939, and also Serial No. 181,832, filed December 27, 1937, for a Manifold valve, which has matured into Patent 2,194,264, dated March 19, 1940, which were copending with application Serial No. 181,831, of which this application is a division.

Particular attention is directed to the fact that the top and bottom plates are full floating in that they are slidably mounted on the sleeve 21 due to the provision of enlarged holes 23 receiving the dowel pins 29 and their rearward movement is only restrained by the head 32 of the packing.

Figure 2:
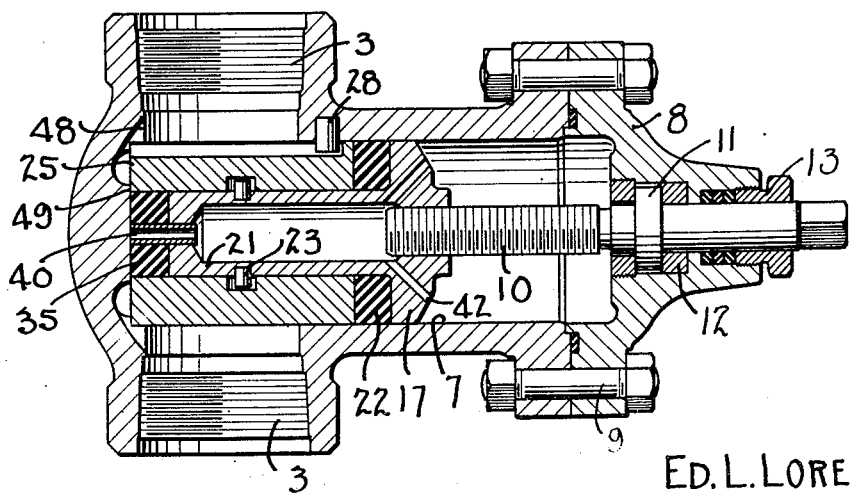
Fig. 2 is a similar section to that shown in Fig. 1 with the valve member in closed position.

Thus when the valve moves to closed position, as seen in Fig. 2, it will be observed that the seat 45 is of greater thickness than the thickness of the hub portion 35, so that the corners 49 of the plates will abut against the seat 45. Of course, when such abutment occurs the plates are prevented from any further movement. Additional movement of the cap member 17, however, may occur if the spindle 10 is rotated and this movement will apply a pressure to the head 32. Inasmuch as the only escape for the resilient material of this packing when opposite pressure occurs would be for the material to flow forwardly along the legs 33 and 34, because the head will be expanded against the cylinder 7 and against the side walls 6 of the vertical passage 4. In this manner additional pressure will be transmitted through the packing along the legs and the head to force it securely against the walls of the valve member and at the same time the hub 35 will be pressed firmly against the seat 45. Thus the valve housing and the plates 25 and 26, along with the cap 17, completely confine the packing material so that almost any desired unit area pressure may be applied to it by rotation of the spindle 10. In this manner if leakage should occur at some one particular point additional rotation of the stem would cause the packing material to flow under pressure into such leaking area and effect a seal.

In event any of the packing on the front face of the hub 35 should wear away, of course, it is possible for the packing to be distorted due to the pressure of the cap 17 and cause this worn away material to be replaced because the top and bottom plates remain stationary and the packing material can flow forwardly between them either from the legs 33 and 34 or from the head 32, and in this manner will automatically compensate for wear by merely setting the spindle 10 with the valve closed tightly.

In order that the valve may be readily moved, the pressure on the forward and the rear sides thereof is equalized through the nipple 40 and the passages 42, it being apparent that the pressure will flow along the inside of the sleeve 21 around the threaded portion of the spindle.

In view of the fact that the entrance to this bypass is through the nipple 40 on the front face of the valve member it seems clear that the pressure can be equalized on the valve or ram member up until the very last instant of sealing because the forward end of this nipple 40 is only sealed off against the seat 45 by the resilient material of the hub 35 which encircles this nipple. In this manner advantage may be taken of the equalizing pressure up to the last instant of closing and will also be available as soon as the valve member is cracked open when it is sought to open the valve because the pressure will instantly flow through the nipple 40 and be equalized on the rear of the ram.

Broadly, the invention contemplates a valve or ram member construction wherein the ram is sealed by confining the resilient material and a bypass is provided through the valve member.

What is claimed is:

1. A valve or ram member comprising a cap, a sleeve thereon, a shoulder on said cap, an annular packing ring about said sleeve, and abutting said cap, leg pieces extending from said ring along the sides of said sleeve, a hub portion of packing material connecting the ends of said leg pieces, said hub portion overlying the end of said sleeve, and retainer plates disposed on the top and bottom of said sleeve and contacting said legs.

2. A valve or ram member comprising a cap, a sleeve thereon, a shoulder on said cap, an annular packing ring about said sleeve and abutting said cap, leg pieces extending from said ring along the sides of said sleeve, a hub portion of packing material connecting the ends of said leg pieces, said hub portion overlying the end of said sleeve, and retainer plates disposed on the top and bottom of said sleeve and contacting said legs, said plates and cap cooperating to confine said packing.

3. A valve or ram member comprising a cap, a sleeve thereon, a shoulder on said cap, an annular packing ring about said sleeve and abutting said cap, leg pieces extending from said ring along the sides of said sleeve, a hub portion of packing material connecting the ends of said leg pieces, said hub portion overlying the end of said sleeve, and retainer plates disposed on the top and bottom of said sleeve and contacting said legs, and a bypass through said hub, sleeve and cap to equalize the pressure on said member.

4. A valve or ram assembly of the character described comprising a resilient packing and metal portions to confine said packing when pressure is applied, and a bypass through said packing from the forward sealing face thereof and through the metal portions to equalize the pressure on the assembly.

5. A packing member for valves or preventers comprising a ring-shaped body portion, legs extending laterally from one side thereof, and a hub portion joining the ends of said legs, and a passage through said hub portion for the by-passing of pressure, which passage is to be closed by the seat against which said hub abuts.

6. A valve including a housing, a passage therethrough to be closed, a valve member movable to close said passage, a seat at one side of said passage, recessed areas above and below said seat, said valve member comprising a metal cap portion, a resilient packing thereon, and retainer plates, the forward ends of said packing and plates abutting said seat, and means to apply pressure to said packing to force it between said plates to seal against said seat and housing, and a passage in the forward end of said packing and through said means to equalize the pressure on said ram, said passage being closed by said seat when the seal is formed.

7. A closure assembly for valves and the like comprising a bonnet to be attached to the valve housing, a spindle rotatable in said bonnet, a ram or valve member mounted for movement by rotation of said spindle, said ram including a body portion to receive said spindle, a forward extension projecting from said cap, a retainer plate floating against each the top and the bottom of said extension, a packing member shaped to fit over said extension, fill the spaces between said plates, and project between the rear ends of the plates and said body.

8. A closure assembly for valves and the like comprising a bonnet to be attached to the valve housing, a spindle rotatable in said bonnet, a ram or valve member mounted for movement by rotation of said spindle, said ram including a body portion to receive said spindle, a forward extension projecting from said body portion, a retainer plate floating against each the top and the bottom of said extension, a packing member shaped to fit over said extension, fill the spaces between said plates, and project between the rear ends of the plates and said body, and an opening through the ram to equalize the pressure thereon during opening and closing of the ram member.

9. A valve of the character described including a housing, a seat therein, a ram member slidable to contact said seat, means to move said ram, said ram including a body and a packing having an opening extending therethrough to equalize the pressure on opposite ends of the ram, said opening being closed by said seat when the ram is closed so as to trap the pressure behind the ram.

10. A member forming the base portion of a composite valve head or ram adapted to operate in a body, comprising a hollow sleeve closed at one end thereof, the other end being provided with an enlarged flange defining the outside dimension of the composite structure, and having a passage through each the closed end and the flange communicating with the hollow portion.

EDMOND L. LOREHN.
HERBERT ALLEN.